(12) United States Patent
Haselhorst et al.

(10) Patent No.: US 9,561,699 B2
(45) Date of Patent: Feb. 7, 2017

(54) CHASSIS LINK FOR A MOTOR VEHICLE

(71) Applicant: Autotech Engineering Deutschland GmbH, Bielefeld (DE)

(72) Inventors: Kai Haselhorst, Versmold (DE); Viktor Friesen, Bielefeld (DE); Denis Geβner, Bielefeld (DE)

(73) Assignee: Autotech Engineering Deutschland GmbH, Bielefeld (DE)

( * ) Notice: Subject to any disclaimer, the term of this patent is extended or adjusted under 35 U.S.C. 154(b) by 0 days.

(21) Appl. No.: 14/644,660

(22) Filed: Mar. 11, 2015

(65) Prior Publication Data
US 2015/0258869 A1 Sep. 17, 2015

(30) Foreign Application Priority Data
Mar. 12, 2014 (EP) .................................. 14159165

(51) Int. Cl.
*B60G 7/00* (2006.01)
*B60G 3/06* (2006.01)

(52) U.S. Cl.
CPC .............. *B60G 3/06* (2013.01); *B60G 7/001* (2013.01); *B60G 2200/154* (2013.01); *B60G 2206/122* (2013.01); *B60G 2206/722* (2013.01)

(58) Field of Classification Search
CPC combination set(s) only.
See application file for complete search history.

(56) References Cited

U.S. PATENT DOCUMENTS

| 4,570,968 A * | 2/1986 | Mukai | B60G 7/001 |
| | | | 280/124.145 |
| 5,845,938 A | 12/1998 | Kato | |
| 8,459,674 B2 * | 6/2013 | Mielke | B60G 3/04 |
| | | | 280/124.134 |
| 8,770,606 B2 * | 7/2014 | Lindtner | B21D 19/08 |
| | | | 280/124.134 |

(Continued)

FOREIGN PATENT DOCUMENTS

| CN | 203293836 U | 11/2013 |
| DE | 202005011340 U1 | 10/2005 |

(Continued)

*Primary Examiner* — Keith Frisby
(74) *Attorney, Agent, or Firm* — The Webb Law Firm

(57) ABSTRACT

The invention relates to a chassis link including a single-shell sheet metal main body, on which a plurality of bearing regions are formed for attaching bearing elements by which the main body can be connected to the bodywork and to a movable part of a wheel suspension of a motor vehicle. The main body includes two arms which merge into one another and define a main-body plane and a concave edge region of the main body. The concave edge region extends from a wheel-side bearing region towards a bodywork-side bearing region and is at an angle relative to the main-body plane. For such a chassis link having a high inherent stiffness and a low weight the invention proposes that the angled, concave edge region includes, along at least one curve length portion, at least one oblique surface which, when viewed in cross section, encloses an angle in the range of from 25° to 75° with a surface, adjacent thereto, of the angled, concave edge region. As a result, the inherent stiffness of the chassis link is increased for a maintained sheet metal thickness.

12 Claims, 4 Drawing Sheets

(56) References Cited

U.S. PATENT DOCUMENTS

| | | | |
|---|---|---|---|
| 9,278,595 B2* | 3/2016 | Ohta | B60G 7/02 |
| 2011/0115186 A1 | 5/2011 | Chiku et al. | |
| 2012/0038126 A1* | 2/2012 | Monchiero | B60G 7/001 |
| | | | 280/124.131 |
| 2015/0283595 A1* | 10/2015 | Haselhorst | B21D 53/88 |
| | | | 156/196 |
| 2015/0352918 A1* | 12/2015 | Peitz | B60G 7/001 |
| | | | 280/124.128 |
| 2016/0068036 A1* | 3/2016 | Minoda | B60G 21/055 |
| | | | 280/124.109 |

FOREIGN PATENT DOCUMENTS

| | | |
|---|---|---|
| DE | 102007018569 A1 | 10/2008 |
| EP | 0794075 A2 | 9/1997 |
| EP | 2295269 A1 | 3/2011 |
| FR | 2864514 A1 | 7/2005 |
| JP | 2011162187 A | 8/2011 |
| WO | 2010004414 A2 | 1/2010 |
| WO | 2013186456 A1 | 12/2013 |

* cited by examiner

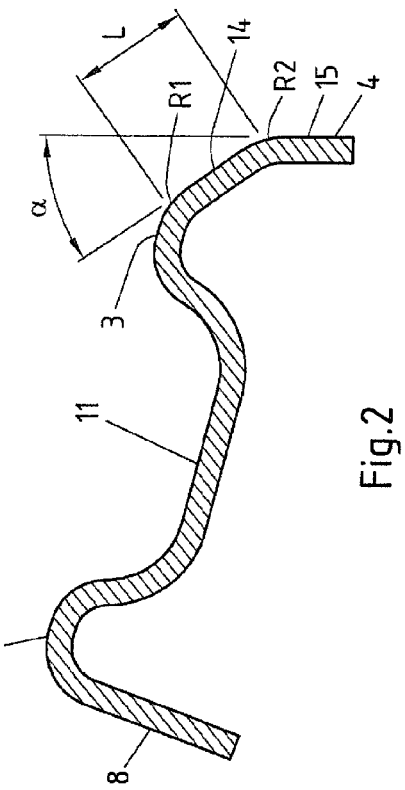
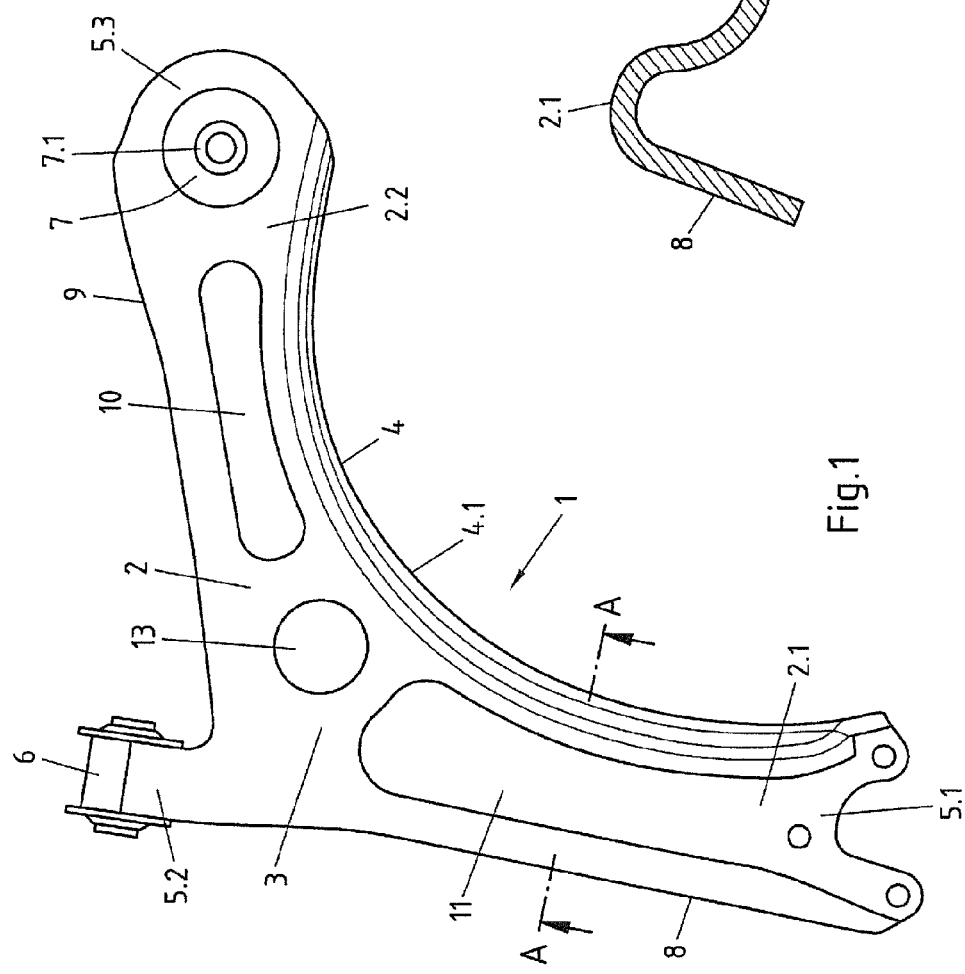

CHASSIS LINK FOR A MOTOR VEHICLE

CROSS-REFERENCE TO RELATED APPLICATION

This application claims priority to European Patent Application No. 14159165.1 filed Mar. 12, 2014, the disclosure of which is hereby incorporated in its entirety by reference.

BACKGROUND OF THE INVENTION

Field of the Invention

The invention relates to a chassis link comprising a single-shell sheet metal main body, on which a plurality of bearing regions are formed for attaching bearing elements by which the main body can be connected to the bodywork and to a movable part of a wheel suspension of a motor vehicle, the main body comprising two arms which merge into one another and define a main-body plane and a concave edge region of the main body, the concave edge region extending from a wheel-side bearing region towards a bodywork-side bearing region and being at an angle relative to the main-body plane.

Description of Related Art

Chassis links which form an attachment member between the bodywork of a motor vehicle and a dynamically movable part of a wheel suspension, in particular a wheel carrier, are known in various designs. They can be formed as cast components or as sheet steel shells. Besides the inherent stiffness and wear resistance of a chassis link of this type, the weight thereof is also crucial, because the vehicle weight and thus the fuel consumption can be reduced by means of a lightweight component having high inherent stiffness.

A known chassis link of the type mentioned at the outset (DE 10 2007 018 569 A1) has a substantially L-shaped or triangular design. The known chassis link is formed as a single shell, a bearing pin for attaching a bush-shaped bearing element being arranged on the end of one of the sheet metal arms of said link. The sheet metal arm has a U-shaped cross-sectional profile and tapers off into a socket which encloses the bearing pin with a wrapping angle of at least 270° and is integrally bonded to the pin. Although a chassis link of this type (transverse control arm) can be produced cost-effectively owing to the single-shell sheet metal design, the inherent stiffness thereof is sometimes unsatisfactory when using a relatively thin sheet to obtain a low component weight.

An object of the present invention is to provide a chassis link which can be produced cost-effectively and is lightweight while having high inherent stiffness (component stiffness).

SUMMARY OF THE INVENTION

The chassis link according to the invention is characterised in that the angled, concave edge region of its main body comprises, along at least one curve length portion, at least one oblique surface which, when viewed in cross section, forms an angle in the range of from 25° to 75° with a surface, adjacent thereto, of the angled, concave edge region.

As a result, the inherent stiffness, in particular the permissible buckling load, of the chassis link is increased for a specified or maintained sheet metal thickness and/or at a constant component weight. In addition, the solution according to the invention results in stresses being distributed in the link in a more uniform manner during operation of the vehicle. Furthermore, the chassis link can be produced cost-effectively owing to the single-shell sheet metal design. This also applies in particular to the shaping of the oblique surface.

The oblique surface formed on the angled, concave edge region of the main body corresponds to or is similar to a chamfer and can be formed along the entire curve length of the angled, concave edge region of the main body. However, to increase the component stiffness, in particular the buckling load, and/or to distribute stresses in the main body in a more uniform manner, it may also be sufficient, according to an embodiment of the invention that is advantageous in production terms, for the oblique surface (chamfer) to only extend over a partial length of the curve length of the angled, concave edge region, for example over less than 80%, in particular less than 60%, of said curve length. In particular, the invention provides that the curve length portion over which the oblique surface extends is at least 10%, preferably at least 20%, of the curve length of the angled, concave edge region.

Another advantageous embodiment of the chassis link according to the invention is characterised in that the angle formed by the oblique surface and the surface, adjacent thereto, of the angled, concave edge region varies along the curve length portion, the variation being at least 5°, preferably at least 10°. This can also further increase the component stiffness, in particular the permissible buckling load. Furthermore, as a result of this embodiment, the distribution of stresses in the main body of the chassis link during operation of the vehicle can be made even more uniform or further optimised.

Internal tests have shown that the component stiffness or the buckling load, which can be supported, of the chassis link is significantly increased in particular when, according to another preferred embodiment of the invention, the oblique surface, when viewed in cross section, has a length in the range of from 5 mm to 20 mm. It has also been found that the component stiffness, the buckling load, which can be supported, of the chassis link and/or the distribution of stresses can be further optimised if, according to a preferred embodiment of the invention, the length of the oblique surface varies along the curve length portion, the variation being at least 1 mm, in particular at least 2 mm.

Particularly preferred is an embodiment of the chassis link according to the invention in which the curve length portion having the oblique surface crosses the region of the main body in which the two arms merge into one another. This embodiment is particularly effective in terms of both the desired increase in the component stiffness and more uniform distribution of stresses.

With regard to more uniform distribution of stresses, it is advantageous if, according to another preferred embodiment of the chassis link according to the invention, the main-body plane merges, with one round edge, into the oblique surface (chamfer). Preferably, said round edge has a radius (outer radius) that is greater than the sheet thickness of the main body, for example from 1.5 times to 3 times the sheet thickness.

According to another preferred embodiment of the chassis link according to the invention, it is also advantageous for more uniform distribution of stresses if the oblique surface thereof merges, with one round edge, into the surface, adjacent thereto, of the angled, concave edge region. Preferably, said round edge has a radius (outer radius) that is also greater than the sheet thickness of the main body, for example from 1.5 to 3 times the sheet thickness.

According to a preferred embodiment, the production costs of a chassis link according to the invention are comparatively low in particular when the main body of the chassis link has an open cross-sectional shape at each bearing region.

To obtain as low a weight as possible yet with high component stiffness, the sheet of the main body should have a thickness in the range of from 2 mm to 6 mm and a tensile strength in the range of from 350 MPa to 1200 MPa. Preferably, the main body should consist of dual-phase steel. Complex phase steels or thermomechanically rolled, cold-formed steels are also well suited for producing the chassis link according to the invention if relatively high strengths or component stiffnesses are desired.

BRIEF DESCRIPTION OF THE DRAWINGS

The invention will be described in more detail below on the basis of drawings which show a number of embodiments and in which:

FIG. 1 is a plan view of a single-shell chassis link moulded from sheet metal;

FIG. 2 is an enlarged cross-sectional view of an arm of the chassis link along the sectional line A-A in FIG. 1;

DETAILED DESCRIPTION OF THE INVENTION

Figure 3:
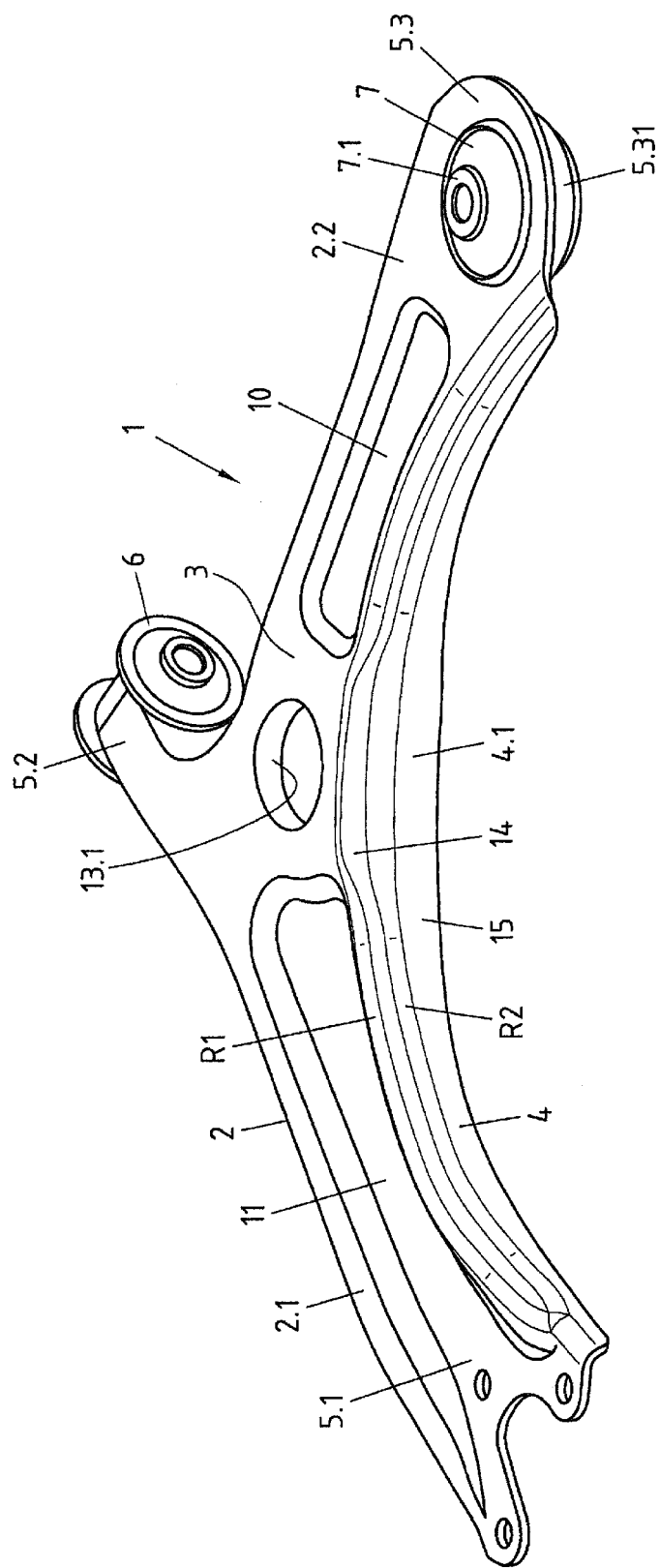
FIG. 3 is a perspective view of a second embodiment of a single-shell chassis link moulded from sheet metal.

The chassis link (transverse control arm) 1 shown in FIG. 1 and 2 comprises a main body which has a substantially L-shaped or triangular design. Said link is formed as a front axle transverse control arm for a motor vehicle, in particular a passenger car.

The main body 2 of the chassis link 1 is designed as a single-shell (single-piece) sheet metal moulded part and is shaped from a sheet metal blank to form the shell, in particular by deep drawing. The main body 2 comprises two arms 2.1, 2.2 which merge into one another and define a main-body plane 3 and a concave edge region 4.

Bearing regions 5.1, 5.2, 5.3 for attaching bearing elements are formed on the main body 2. One of the bearing elements is a flange sleeve 6 which is welded to the bearing region 5.2 and receives a rubber-coated bearing bush (not shown). A bearing pin (not shown) is mounted on the wheel-side bearing region 5.1 and is typically formed as a ball joint. The bearing region 5.3 formed as a bearing eyelet is used for receiving a rubber member 7 which encloses a bearing bush (flange sleeve) 7.1 in an interlocking and integral manner. The bearing eyelet 5.3 comprises a peripheral collar (passage) 5.31.

The concave edge region 4 of the main body 2 extends from the wheel-side bearing region 5.1 up to a bodywork-side bearing region 5.3 and is at an angle relative to the main-body plane 3. The edge regions 8, 9, opposite the concave edge region 4, of the arms 2.1, 2.2 are also at an angle, and more specifically in approximately or almost the same direction as the concave edge region 4 so that the arms 2.1, 2.2 have a substantially U-shaped or W-shaped cross-sectional profile. At each bearing region 5.1, 5.2, 5.3, the main body 2 has an open cross-sectional shape.

Beads or recesses 10, 11 are moulded into the main-body plane 3. In addition, through-holes, for example an opening 13 comprising a peripheral collar (passage) 13.1, can be provided in the main-body plane 3 and/or in at least one of the recesses 10, 11. In this case, the collar 13.1, 5.31 projects from the side of the main body 2 from which the angled edge regions 4, 8, 9 also protrude.

The concave edge region 4 of the main body 2 has an oblique surface (chamfer) 14 which, when viewed in cross section, forms an angle α in the range of from 25° to 75° with the surface 15 adjacent thereto (cf. FIG. 2). When viewed in cross section, the surfaces 14, 15 each comprise a substantially straight length or depth portion. The oblique surface 14 is delimited by two radii or round edges R1, R2.

The chamfer 14 extends at least along one curve length portion of the angled, concave edge region 4, said curve length portion being at least 10%, preferably at least 20%, of the curve length of the concave edge region 4.

In the embodiment shown in FIG. 1 and 2, the oblique surface (chamfer) 14 extends over almost the entire curve length of the angled, concave edge region 4. It is only at the end of the arm 2.1, on which the wheel-carrier-side bearing region 5.1 is formed, that the angled, concave edge region 4 of the main body 2 has a curve length portion having no chamfer 14 (cf. FIG. 1).

The angle α formed by the oblique surface 14 and the surface 15 adjacent thereto is designed to be substantially constant along the curve length portion or the angled, concave edge region 4. The angle α is for example approximately 35° (cf. FIG. 2). The length (depth) L of the oblique surface 14 is also designed to be substantially constant along the curve length portion of the concave edge region 4. At the sectional line A-A in FIG. 1, the length (depth) L is for example approximately 15 mm (cf. FIG. 2).

The embodiment shown in FIG. 3 of the chassis link laccording to the invention differs from that shown in FIG. 1 and 2 in that the angle α formed by the oblique surface 14 and the surface 15 adjacent thereto varies along the curve length portion or angled, concave edge region 4. At the central portion of the arm 2.1, the angle α is for example approximately 35°. By contrast, in the central region 4.1 of the curve length of the angled, concave edge region 4, for example where the arms 2.1, 2.2 merge into one another or where the edge region 4 is closest to the through-opening 13, the angle α is significantly greater, for example in the range of from 45° to 60°. The angle α becomes smaller, starting from the central region 4.1, towards the end of the sheet metal arm 2.2 on which the bearing region 5.3 is formed, said angle having a value for example in the range of from 30°0 to 40° at the end of the arm or near the end of the arm 2.2.

It can also be seen in FIG. 3 that the length (depth) L of the oblique surface 14 varies along the curve length prortion of angled, concave edge region 4. When viewed in the cross section of the respective arm 2.1, 2.2, the oblique surface 14 has a length L in the range of from 5 mm to 20 mm. At the central portion of the arm 2.1, the length (depth) L is for example approximately 15 mm. However, in the central region 4.1 of the curve length of the edge region 4, for example where the arms 2.1, 2.2 merge into one another of where the edge region 4 is closest to the through-opening 13, the length L of the oblique surface 14 is significantly greater, for example between 16 mm and 20 mm. The length (depth) L of the chamfer 14 becomes smaller, starting from the central region 4.1, towards the bearing eyelet 5.3, said length having a value for example of between 5 mm and 15 mm at the end of the arm or near the end of the arm 2.2.

In the chassis link 1 shown in FIG. 3, the angle α and the length (depth) L of the oblique surface (chamfer) 14 of the angled, concave edge region 4 is thus significantly greater in the central region 4.1 of the link 1 than at the free ends of its arms 2.1, 2.2.

Figure 4:
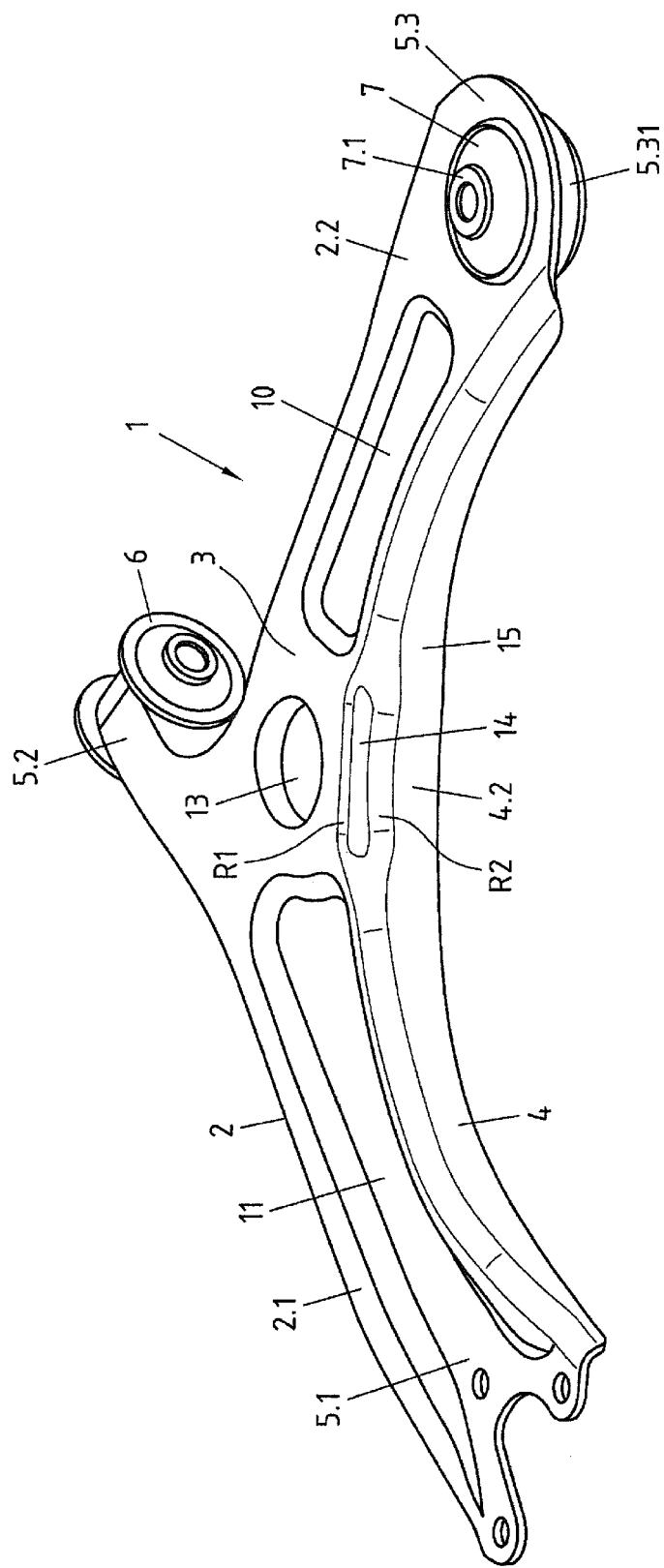
FIG. 4 is a perspective view of a third embodiment of a single-shell chassis link moulded from sheet metal.

The embodiment shown in FIG. 4 of the chassis link 1 according to the invention differs from that shown in FIGS. 1 and 2 in that the oblique surface (chamfer) 14 extends over a significantly shorter partial length of the curve length of the angled, concave edge region 4 than in the chassis link shown in FIGS. 1 to 3. In this case, the chamfer 14 extends substantially along a curve length portion 4.2 that is close to the opening 13 or between the mutually facing ends of the recesses 10, 11 in the main body 2. The arms 2.1, 2.2 of the transverse control arm 1 merge into one another in this curve length portion 4.2. In the embodiment according to FIG. 4, the angle α and the length (depth) L of the oblique surface 14 hardly vary or vary only slightly over the course of the surface 14.

Figure 5:
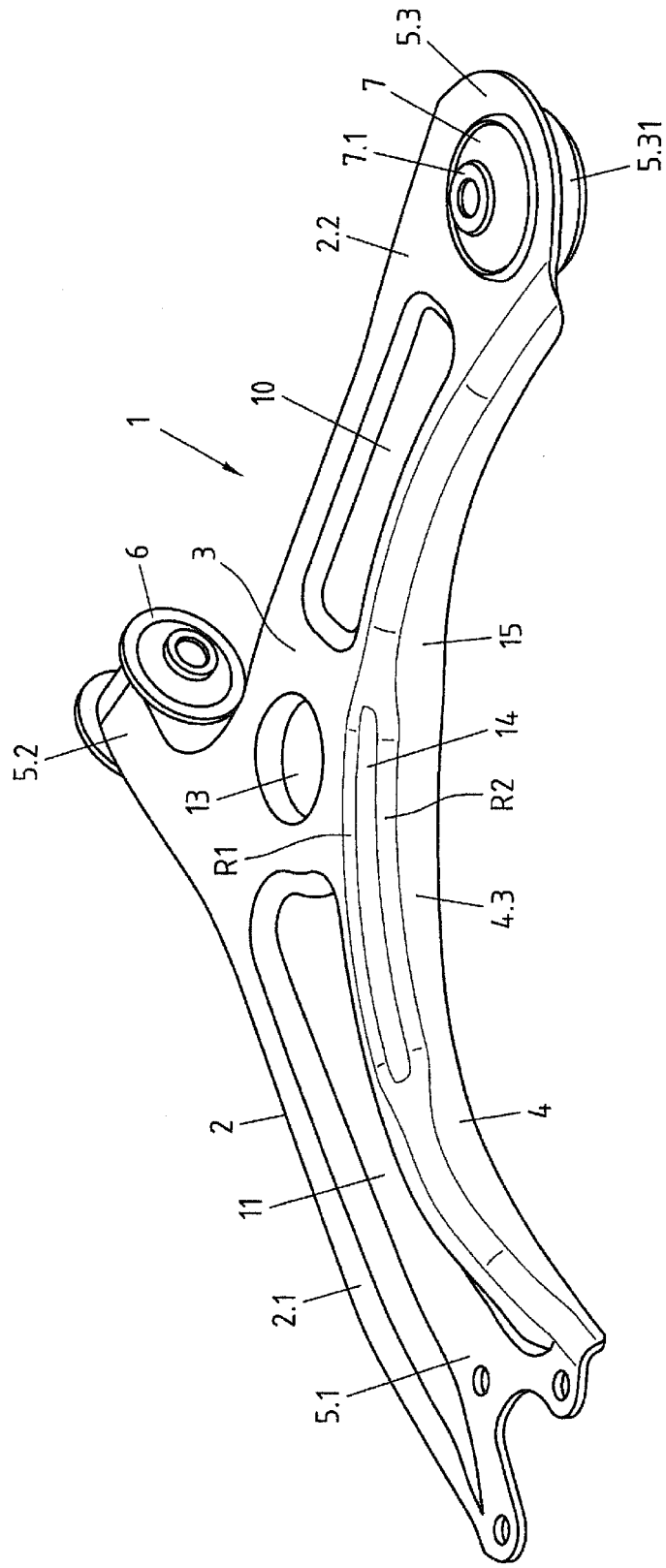
FIG. 5 is a perspective view of a fourth embodiment of a single-shell chassis link moulded from sheet metal.

The embodiment shown in FIG. 5 of the chassis link according to the invention also differs from that shown in FIGS. 1 and 2 in that the oblique surface 14 extends over a significantly shorter partial length of the curve length of the angled, concave edge region 4 than in the chassis link according to FIGS. 1 and 2. In this case, the chamfer 14 extends substantially along a curve length portion 4.3 that is close to the opening 13 (or the centre of the link) and next to a longitudinal portion of the recess 11 in the arm 2.1. In the chassis link 1 according to FIG. 5, the angle α and the length (depth) L of the oblique surface 14 hardly vary or vary only slightly over the course of the surface 14.

The invention is not limited to the embodiments shown in the drawings, but rather numerous variants are conceivable which also make use of the invention as set out in the appended claims, even if the design thereof differs from said embodiments. For example, a chassis link 1 according to the invention can also comprise two or more successive oblique surfaces (chamfers) 14 along a curve length portion of the angled, concave edge region 4 which, when viewed in cross section, each form an angle in the range of from 25° to 75° with a surface 15, adjacent thereto, of the angled, concave edge region 4.

The invention claimed is:

1. A chassis link comprising a single-shell sheet metal main body, on which a plurality of bearing regions are formed for attaching bearing elements by which the main body can be connected to the bodywork and to a movable part of a wheel suspension of a motor vehicle, the main body comprising two arms which merge into one another and define a main-body plane and a concave edge region of the main body, the concave edge region extending from a wheel-side bearing region towards a bodywork-side bearing region and being at an angle relative to the main-body plane, wherein the angled, concave edge region comprises, along at least one curve length portion, at least one oblique surface which corresponds to a chamfer and, when viewed in cross section, forms an angle in the range of from 25° to 75° with a surface, adjacent thereto, of the angled, concave edge region, wherein the curve length portion is at least 10% of the curve length of the angled, concave edge region, and wherein, when viewed in cross section, the oblique surface has a length in the range of 5 mm to 20 mm.

2. The chassis link according to claim 1, wherein the angle formed by the oblique surface and a surface, adjacent thereto, of the angled, concave edge region varies along the curve length portion, the variation being at least 5°.

3. The chassis link according to claim 1, wherein the length of the oblique surface varies along the curve length portion, the variation being at least 1 mm.

4. The chassis link according to claim 1, wherein the curve length portion having the oblique surface crosses the region of the main body in which the two arms merge into one another.

5. The chassis link according to claim 1, wherein the main-body plane merges, with a round edge, into the oblique surface.

6. The chassis link according to claim 1, wherein the oblique surface merges, with a round edge, into the surface, adjacent thereto, of the angled, concave edge region.

7. The chassis link according to claim 1, wherein the main body has an open cross-sectional shape at each bearing region.

8. The chassis link according to claim 1, wherein the sheet has a thickness is the range of from 2 mm to 6 mm and a tensile strength in the range of from 350 MPa to 1200 MPa.

9. The chassis link according to claim 1, wherein the main body consists of dual-phase steel, complex phase steel or thermomechanically rolled, cold-formed steel.

10. The chassis link according to claim 1, wherein the curve length portion is at least 20% of the curve length of the angled, concave edge region.

11. The chassis link according to claim 1, wherein the angle formed by the oblique surface and a surface, adjacent thereto, of the angled, concave edge region varies along the curve length portion, the variation being at least 10°.

12. The chassis link according to claim 1, wherein the length of the oblique surface varies along the curve length portion, the variation being at least 2 mm.

* * * * *